(12) United States Patent
Han et al.

(10) Patent No.: US 10,339,830 B2
(45) Date of Patent: Jul. 2, 2019

(54) DEVICE FOR PROVIDING DESCRIPTION INFORMATION REGARDING WORKOUT RECORD AND METHOD THEREOF

(71) Applicant: Samsung Electronics Co., Ltd., Gyeonggi-do (KR)

(72) Inventors: Seung Wok Han, Seoul (KR); Jung Ki Min, Gyeonggi-do (KR); Kwan Su Park, Gyeonggi-do (KR); Jong Kun Lee, Gyeonggi-do (KR); Seong Ook Jeong, Gyeonggi-do (KR); Kyung Sub Min, Gyeonggi-do (KR); Ik Hwan Cho, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 588 days.

(21) Appl. No.: 14/989,652

(22) Filed: Jan. 6, 2016

(65) Prior Publication Data

US 2016/0193503 A1    Jul. 7, 2016

(30) Foreign Application Priority Data

Jan. 6, 2015   (KR) .................. 10-2015-0001291

(51) Int. Cl.
| | |
|---|---|
| *G09B 19/00* | (2006.01) |
| *G09B 5/00* | (2006.01) |
| *G09B 5/06* | (2006.01) |
| *G09B 7/02* | (2006.01) |

(52) U.S. Cl.
CPC .............. *G09B 19/00* (2013.01); *G09B 5/00* (2013.01); *G09B 5/062* (2013.01); *G09B 7/02* (2013.01)

(58) Field of Classification Search
CPC .......... G09B 19/00; G09B 5/00; G09B 5/062; G09B 7/02
USPC ....................................... 434/247
See application file for complete search history.

(56) References Cited

U.S. PATENT DOCUMENTS

| | | |
|---|---|---|
| 2014/0180454 A1 | 6/2014 | Weast et al. |
| 2014/0280219 A1* | 9/2014 | Maser .......... G11B 27/031 707/748 |
| 2014/0288680 A1* | 9/2014 | Hoffman .......... G06K 9/00342 700/91 |
| 2014/0300603 A1 | 10/2014 | Greenfield |

* cited by examiner

Primary Examiner — Robert P Bullington

(57) ABSTRACT

An electronic device is provided. The electronic device includes a sensor circuit configured to obtain workout associated data using at least one or more sensors, a processor electrically connected with the at least one or more sensors, and a memory electrically connected with the processor. The processor is configured to classify the obtained data for each kind, divide the data, which is classified for each kind, into a plurality of sections, compare the sections with each other and select at least one or more sections, and provide description information about the selected section.

18 Claims, 11 Drawing Sheets

DEVICE FOR PROVIDING DESCRIPTION INFORMATION REGARDING WORKOUT RECORD AND METHOD THEREOF

CROSS-REFERENCE TO RELATED APPLICATIONS AND CLAIM OF PRIORITY

The present application is related to and claims benefit under 35 U.S.C. § 119(a) of a Korean patent application filed on Jan. 6, 2015 in the Korean Intellectual Property Office and assigned Serial number 10-2015-0001291, the entire disclosure of which is hereby incorporated by reference.

TECHNICAL FIELD

The present disclosure relates to an electronic device for providing description information about workout record of a user and a method thereof. In particular, the electronic device and the method may obtain data associated with a workout of the user and may provide description data about a specific section through the analysis of the obtained data.

BACKGROUND

With developments of information and communication technology, network devices such as a base station and the like are installed throughout the country. The electronic device receives and transmits data from and to another electronic device through a network, and thus a user utilizes the network freely anywhere in the country. Various kinds of the electronic devices provide a variety of functions in accordance with the recent trend of the digital convergence. For example, a smart phone supports Internet connection through the network as well as a call function. Furthermore, the smart phone supports the following, playback of music or video, capturing of video, photo, and the like using an image sensor, and the like.

SUMMARY

To address the above-discussed deficiencies, it is a primary object to provide at least the advantages described below. Accordingly, an aspect of the present disclosure is to provide an electronic device which provides description information about a workout record of a user and a method thereof.

In accordance with an aspect of the present disclosure, an electronic device is provided. The electronic device may include a sensor circuit configured to obtain workout associated data using at least one or more sensors, a processor electrically connected with the at least one or more sensors, and a memory electrically connected with the processor. The processor may classify the obtained data for each kind, may divide the data, which is classified for each kind, into a plurality of sections, may compare the sections with each other and selects at least one or more sections, and may provide description information about the selected section.

In accordance with another aspect of the present disclosure, a method performed on an electronic device is provided. The method may include obtaining workout associated data using at least one or more sensors, classifying the obtained data for each kind, dividing the data, classified for each kind, into a plurality of sections, compares the sections with each other and selects at least one or more sections, and providing description information about the selected section.

In accordance with still another aspect of the present disclosure, a computer recording medium recorded with a computer-readable instruction is provided. The instruction, when executed at least one processor, may cause the processor to perform a method, the method including obtaining workout associated data using at least one or more sensors, classifying the obtained data for each kind, dividing the data, classified for each kind, into a plurality of sections, compares the sections with each other and selects at least one or more sections, and providing description information about the selected section.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
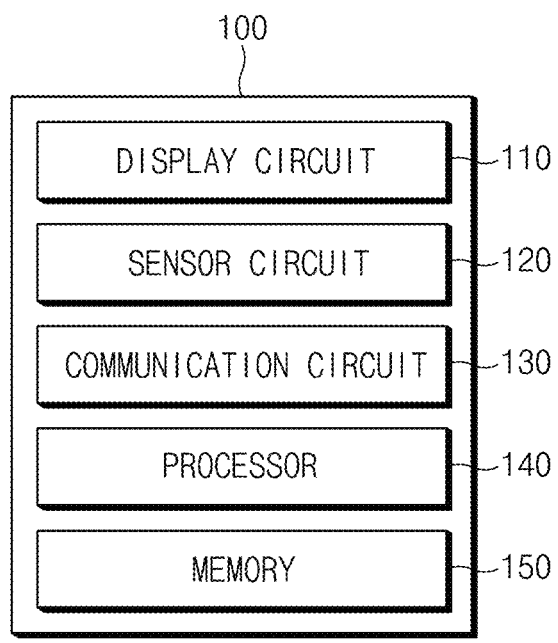
FIG. 1 is a block diagram of an electronic device providing description information, according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have", "may have", "include" and "comprise", or "may include" and "may comprise" used herein indicate existence of corresponding features (such as elements such as numeric values, functions, operations, or components) but do not exclude presence of additional features.

In the disclosure disclosed herein, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (such as a first element) is referred to as being "(operatively or communicatively) coupled with/to" or "connected to" another element (such as a second element), it can be directly coupled with/to or connected to the other element or an intervening element (such as a third element) may be present. In contrast, when an element (such as a first element) is referred to as being "directly coupled with/to" or "directly connected to" another element (such as a second element), it should be understood that there are no intervening element (such as a third element).

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (such as an embedded processor) for performing a corresponding operation or a generic-purpose processor (e.g., a central processing unit (CPU) or an application processor) which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that teens, which are defined in a dictionary and commonly used, should also be interpreted as is customary in the relevant related art and not in an idealized or overly formal detect unless expressly so defined herein in various embodiments of the present disclosure. In some cases, even if teems are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG- 2) Audio Layer 3 (MP3) players, mobile medical devices, cameras, wearable devices (such as head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes (such as SAMSUNG HOMESYNC™, APPLE TV™, or GOOGLE TV™), game consoles (such as XBOX™ and PLAYSTATION™), electronic dictionaries, electronic keys, camcorders, electronic picture frames, and the like.

According to various embodiments of the present disclosure, the electronic devices may include at least one of medical devices (such as various portable medical measurement devices (such as a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (such as navigation systems and gyrocompasses), avionics, security devices, head units for vehicles, industrial or home robots, automatic teller's machines (ATMs), points of sales (POSs), or internet of things (such as light bulbs, various sensors, electric or gas meters, sprinkler devices, fire alarms, thermostats, street lamps, toasters, exercise equipment, hot water tanks, heaters, boilers, and the like).

According to a certain embodiment of the present disclosure, the electronic devices may include at least one of furniture or buildings/structures, electronic boards, electronic signature receiving devices, projectors, or various measuring instruments (such as water meters, electricity meters, gas meters, or wave meters, and the like). The electronic devices according to an embodiment of the present disclosure may be one or more combinations of the above-mentioned devices. According to a certain embodiment of the present disclosure, an electronic device may be a flexible electronic device. Also, electronic devices according to various embodiments of the present disclosure are not limited to the above-mentioned devices, and may include new electronic devices according to technology development.

Hereinafter, electronic devices according to an embodiment of the present disclosure will be described with reference to the accompanying drawings. The term "user" used herein may refer to a person who uses an electronic device or may refer to a device (such as an artificial electronic device) that uses an electronic device. Also, in accompanying drawings, an electronic device according to various embodiments of the present disclosure will be described as being a smart phone.

FIG. 1 is a block diagram of an electronic device providing description information, according to various embodiments of the present disclosure. An electronic device 100 may at least include a display circuit 110, a sensor circuit 120, a communication circuit 130, a processor 140, and a memory 150. However, a configuration of the electronic device 100 illustrated in FIG. 1 may be only an example and may be variously changed or modified. For example, the electronic device 100 may further include a user interface for receiving any instruction or information from a user. In this case, the user interface may be an input device such as a keyboard, a mouse, or the like, but the user interface may also be a graphic user interface (GUI) displayed on a screen of the electronic device 100.

The display circuit 110 may display various contents (such as an application execution screen, a text, an image, a video, an icon, a symbol, and the like) on a screen (not illustrated) of the electronic device 100. The screen may include, for example, a liquid crystal display (LCD), a light emitting diode (LED) display, an organic LED (OLED) display, a microelectromechanical systems (MEMS) display, an electronic paper, or the like.

The sensor circuit 120 may obtain workout associated data using at least one or more sensors. The sensor may include, for example, at least one of a gesture sensor, a gyro sensor, a pressure sensor, a magnetic sensor, an acceleration sensor, a grip sensor, a proximity sensor, a color sensor (such as red, green, blue (RGB) sensor), a living body sensor, a temperature/humidity sensor, an illuminance sensor, or an UV sensor. According to various embodiments of the present disclosure, the sensor module 120 may further include a control circuit for controlling the at least one or more sensors included therein.

The communication circuit 130 may perform communication using a network. The network may mean a connection structure which allows nodes such as terminals and servers to exchange information each other and may include a wireless communication and a wired communication. The wireless communication may include at least one of, for example, LTE, LTE-A, CDMA, WCDMA, UMTs, WiBro, GSM, or the like, as cellular communication protocol. Furthermore, the wireless communication may include, for example, a local area network. The local area network may include at least one of a Wi-Fi, a near field communication (NFC), a global positioning system (GPS), or the like. The wired communication may include at least one of, for example, a universal serial bus (USB), a high definition multimedia interface (HDMI), a recommended standard-132 (RS-132), or a plain old telephone service (POTS). The network may include at least one of telecommunications networks, for example, a computer network (such as LAN or WAN), an Internet, or a telephone network.

The processor 140 may be implemented with, for example, a system on chip (SoC) and may include one or more of a central processing unit (CPU), a graphic processing unit (GPU), an image signal processor, an application processor (AP), and a communication processor (CP). The processor 140 may load and process an instruction or data, which is received from at least one of other components (such as a nonvolatile memory), and may store a variety of data at a nonvolatile memory.

The processor 140 may execute the workout associated application and may display the executed workout associated application on the screen of the electronic device 100 through the display circuit 110. The user may set a workout course and the like to the workout associated application and may work out with the electronic device 100. The processor 140 may classify the workout associated data obtained by the sensor circuit 120, for each kind. The workout associated data may include at least one or more of the following kinds of data: workout time data, workout distance data, heart rate data, altitude data, speed data, heart rate data according to a workout time, altitude data according to a workout time, speed data according to a workout time, workout distance data according to a workout time, heart rate data according to a workout distance, altitude data according to a workout distance, speed data according to a workout distance, workout distance data according to a workout distance, and the like.

The processor 140 may divide the workout associated data, which is classified for each kind, into a plurality of sections. For example, the processor 140 may divide the data, which is classified for each kind, based on at least one or more of a workout time, a heart rate, an altitude, a speed, and a workout distance. The processor 140 may compare the sections with each other and may select at least one section. The selected section may be a meaningful section distinguished from other sections and may be a section necessitating a description for helping understanding of a user.

For example, the processor 140 may compare the sections with each other and may select one section by further comparing the sections with a user average value of the classified workout associated data. For example, in the case where the workout associated data is speed data about a workout time or speed data for a workout duration time, the user average value may mean an average speed about the whole workout course. Furthermore, the processor 140 may compare the sections with each other and may select one section by further comparing the sections with a reference value of the classified data. For example, in the case where the workout associated data is heart rate data, the reference value may include average heart rate data of an adult male or average heart rate data of an adult woman. The reference value may be set differently according to a sex, an age, a medical history, and the like of the user. Similarly, in the case where the workout associated data is speed data about a workout time, the reference value may include an average workout time of an adult male or an average workout time of an adult woman. Alternatively, the reference value may be speed data about a workout time of a virtual character selected by the user through a user input. For example, speed data about a workout time of the virtual character (such as a pacer) may be a speed which changes, after a workout starts, every five minutes repetitively in the following order: 6 km/h, 8 km/h, 10 km/h, 10 km/h, and 5 km/h.

The processor 140 may provide description information about the selected section. For example, the processor 140 may display a graph about the classified workout associated data on the executed workout associated application. The processor 140 may map the selected section to the displayed graph and may display the description information about the selected section. The description information may include at least one or more of data analysis information, workout effect information, and workout coaching information associated with the selected section.

According to various embodiments of the present disclosure, the processor 140 may provide a reward in the case where the obtained workout associated data satisfies a given condition. For example, in the case where the speed data exceeds 15 km/h, the processor 140 may provide a reward corresponding to such the case. For example, in the case where the altitude data exceeds 1 km, the processor 140 may provide a reward corresponding to such the case. Similarly, the processor 140 may provide a reward in the case where a value (hereinafter referred to as "accumulated value"), accumulated for each kind, among the obtained data satisfies a given condition. For example, in the case where accumulated distance data exceeds 42.19 5 km, the processor 140 may provide a reward corresponding to such the case.

For example, the processor 140 may provide a reward, for example, in the case where a user speed, a hill climbing distance, a workout distance, a workout time, a consumed calorie, a pace, and the like satisfy a given condition. Furthermore, the processor 140 may provide a reward corresponding to a workout frequency of the user, for example, corresponding to the case where the user works out repetitively every day. The given condition may be a condition directly set by the user. The reward may exist for each of a plurality of sections. For example, the processor 140 may provide the user with rewards which are classified so as to be provided every two weeks, every four weeks, or in his/her life.

The processor 140 may transmit the obtained workout associated data, the accumulated value of each kind, or the reward to a social network service (SNS) server through the communication circuit 130. The SNS server may be, for example, a provider server such as Facebook, twitter, Instagram, or the like. Transmission of the obtained workout associated data, the accumulated value of each kind, or the reward to the SNS server may be performed through a user input. For example, in the case where the user wants to upload a workout record on his/her Facebook, the user may click a share button or the like, and the processor 140 may perform the operation based thereon. According to various embodiments of the present disclosure, the processor 140 may also transmit the workout associated image or an image (such as a still cut image captured by an image sensor), obtained through the sensor during the workout, to the SNS server. In this case, the obtained workout associated data, the accumulated value of each kind, or the reward may be displayed on the workout associated image or on an image obtained through the sensor in the form of a text or an image.

The processor 140 may receive the workout associated data from another electronic device (such as a Galaxy gear paired with a Galaxy note) connected with the electronic device 100 through the communication circuit 130. For example, in the case where the user works out only with a wearable device, there may be a need to use the workout associated data stored in the wearable device. In this case, the processor 140 may perform the above-described operations using both the workout associated data obtained by the electronic device 100 and the workout associated data received from another electronic device.

The memory 150 may store, for example, instructions about operations performed by the processor 140. Data stored in the memory 150 may include data exchanged between internal components of the electronic device 100 and data exchanged between the electronic device 100 and external components thereof. For example, the memory 150 may store the workout associated application and the like. The memory 150 may include an embedded (or internal) memory or an external memory. For example, the embedded memory may include at least one of a volatile memory (such as a dynamic random access memory (DRAM), a static RAM (SRAM), or a synchronous DRAM (SDRAM)), a nonvolatile memory (such as a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard disk drive (HDD), or a solid state drive (SSD).

The external memory may include a flash drive, for example, compact flash (CF), secure digital (SD), micro secure digital (Micro-SD), mini secure digital (Mini-SD), extreme digital (xD), multimedia card (MMC), or memory stick. The external memory may be functionally and/or physically connected to the electronic device 100 through various interfaces. It may be easily understood that the display circuit 110, the sensor circuit 120, the communication circuit 130, the processor 140, and the memory 150 are implemented independently of each other or two or more thereof are integrated. Furthermore, the above-described SNS server or an external electronic device may be connected with the electronic device 100 through the network.

Figure 2:
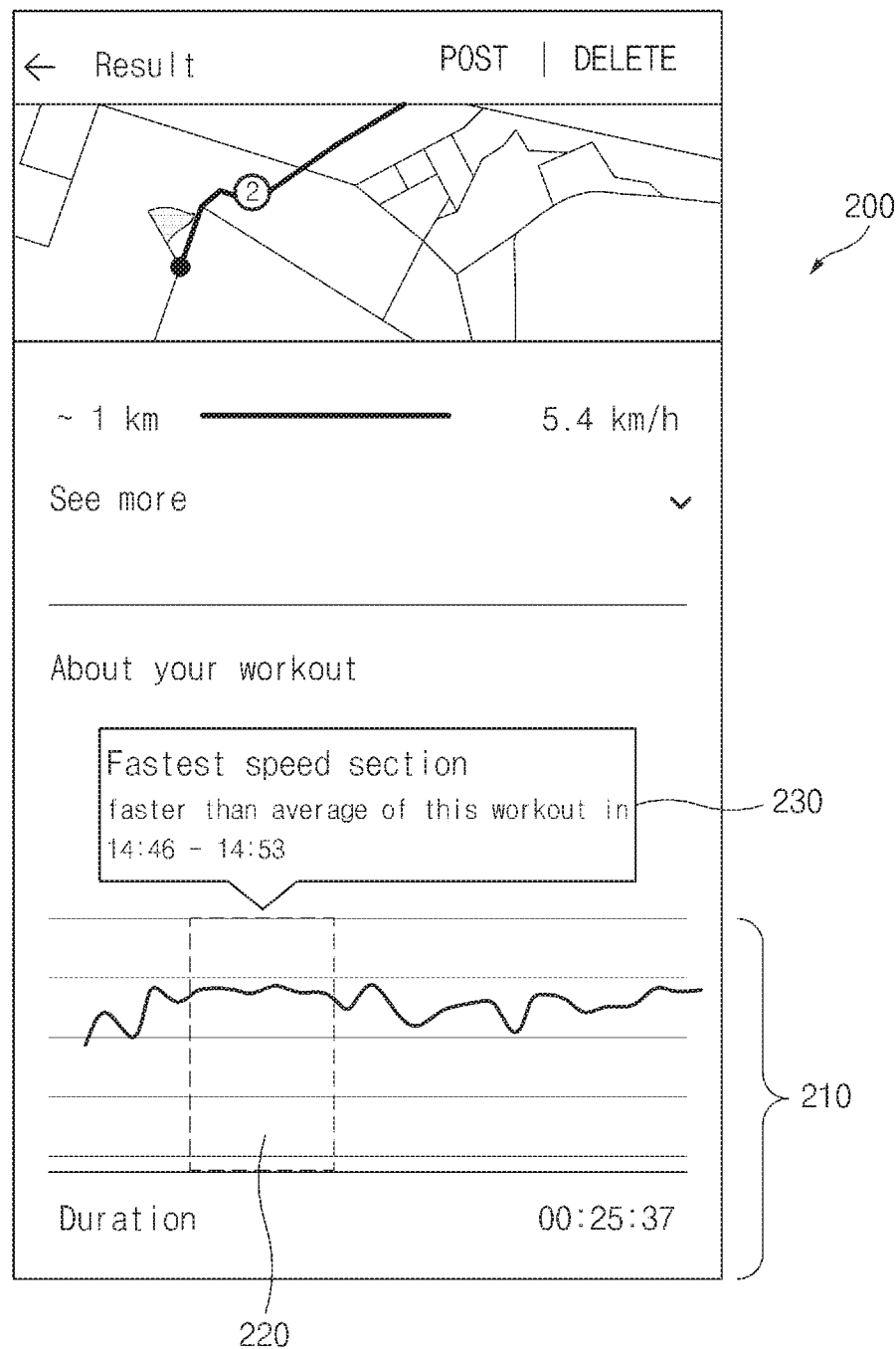
FIG. 2 is a diagram illustrating an execution screen of a workout application, including a graph about a workout associated data and description information about a specific section displayed over the graph, according to various embodiments of the present disclosure.

FIG. 2 is a diagram illustrating an execution screen of a workout application, including a graph about workout associated data and description information about a specific section displayed over the graph, according to various embodiments of the present disclosure. Referring to FIG. 2, the processor 140 may create a graph about a moving speed for a workout time. The graph 210 may indicate a workout time about the whole workout, but the graph 210 may be able to be created to indicate a workout time about a part of the whole workout in the light of a screen size, a resolution, and the like of the electronic device 100.

The processor 140 may select a section 220 distinguishable from other sections, from the graph 210. The section 220 may be a section in which the user works out faster than an average speed. In addition, the section 220 may be a section, of which the workout duration is longest, from among sections in each of which the user works out faster than an average speed. Referring to description information 230, a detailed description about the section 220 may appear. Referring to FIG. 2, map data including a workout course set by the user, a workout distance, and the like may be further displayed on an execution screen 200 of a workout application, but a description thereof is omitted.

Figure 3:
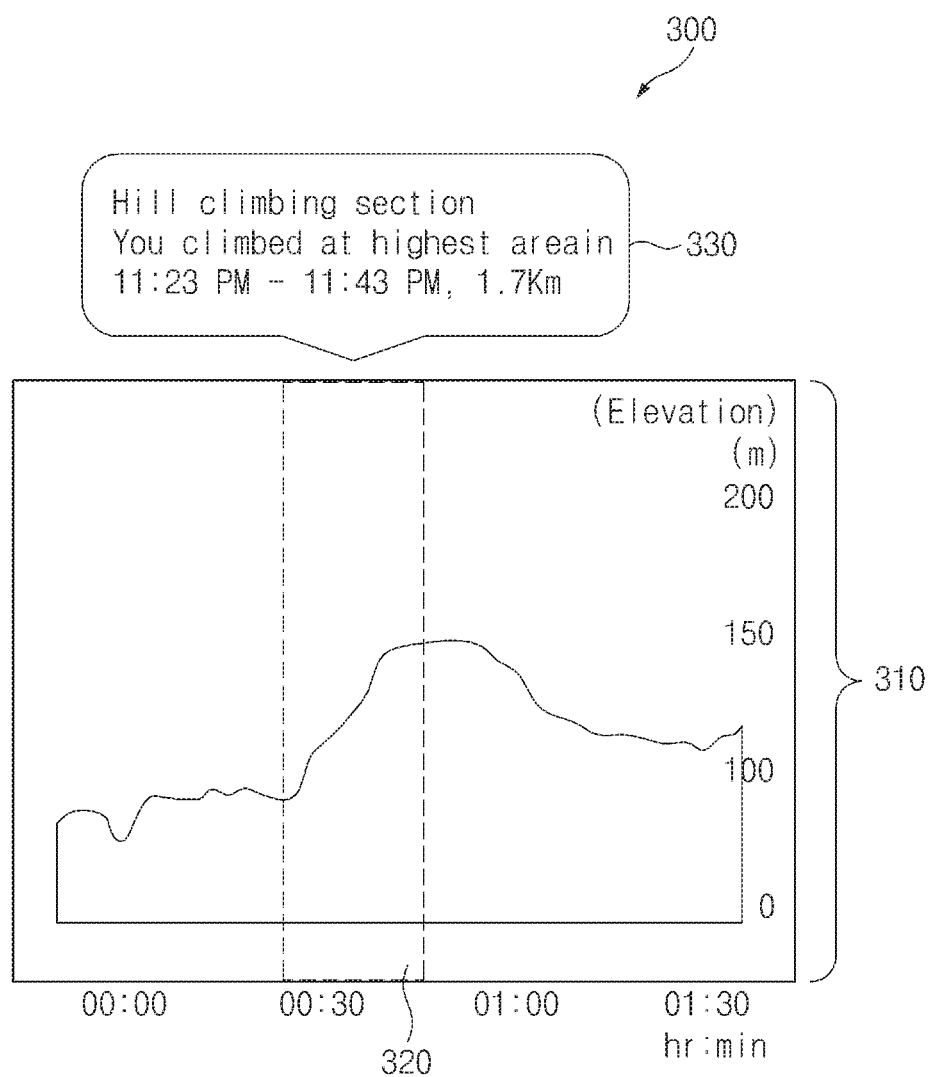
FIG. 3 is a diagram illustrating an execution screen of a workout application, including a graph about a workout associated data and description information about a specific section displayed over the graph, according to various embodiments of the present disclosure.

FIG. 3 is a diagram illustrating an execution screen 300 of a workout application, including a graph about workout associated data and description information about a specific section displayed over the graph, according to various embodiments of the present disclosure. Referring to FIG. 3, the processor 140 may create a graph 310 about an altitude for a workout time. The processor 140 may select a section 320 distinguishable from other sections, from the graph 310. The section 320 may be a section in which the user ascends highest per unit of time or a section in which the user ascends an uphill road during the longest time, and a corresponding detailed description may appear in description information 330.

Figures 4A, 4B:
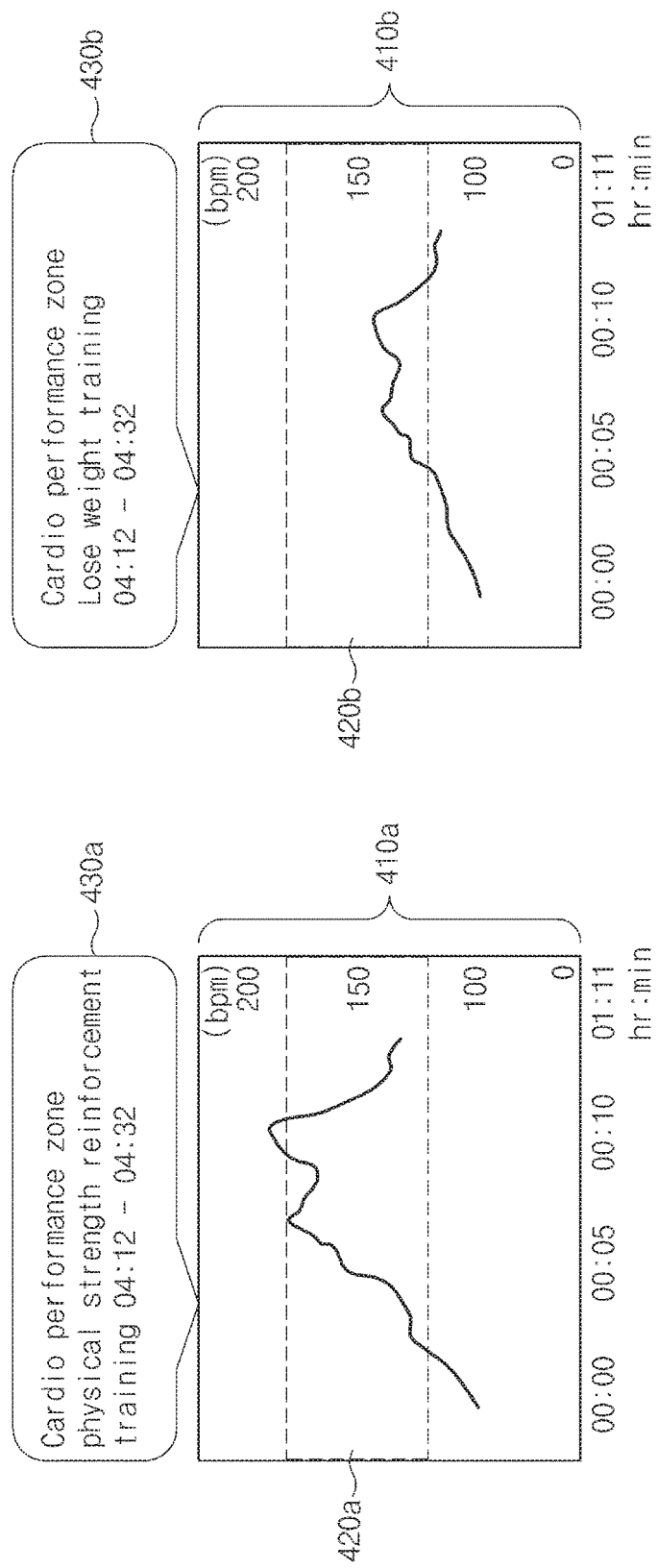
FIG. 4A is a diagram illustrating an execution screen of a workout application, including a graph about a workout associated data and description information about a specific section displayed over the graph, according to various embodiments of the present disclosure.
FIG. 4B is a diagram illustrating an execution screen of a workout application, including a graph about a workout associated data and description information about a specific section displayed over the graph, according to various embodiments of the present disclosure.

FIGS. 4A and 4B are diagrams illustrating an execution screen of a workout application, including a graph about workout associated data and description information about a specific section displayed over the graph, according to various embodiments of the present disclosure. Referring to FIGS. 4A and 4B, the processor 140 may create a graph 410a about a heart rate for a workout time. The processor 140 may select a section 420a distinguishable from other sections, from the graph 410a. The section 420a may be a section in which a heart rate is included in a reference value range, and that the user works out to reinforce the physical strength may appear in description information 430a. The processor 140 may generate a reference value based on kinematic knowledge and a user-inputted profile. Referring to a drawing illustrated at the right of FIGS. 4A and 4B, the processor 140 may create a graph 410a about a heart rate for a workout time. The processor 140 may select a zone 420b distinguishable from other zones, from the graph 410b. The zone 420a may be a zone in which a heart rate is included in a reference value range, and that the user works out to lose his/her weight may appear in description information 430b.

Figure 5:
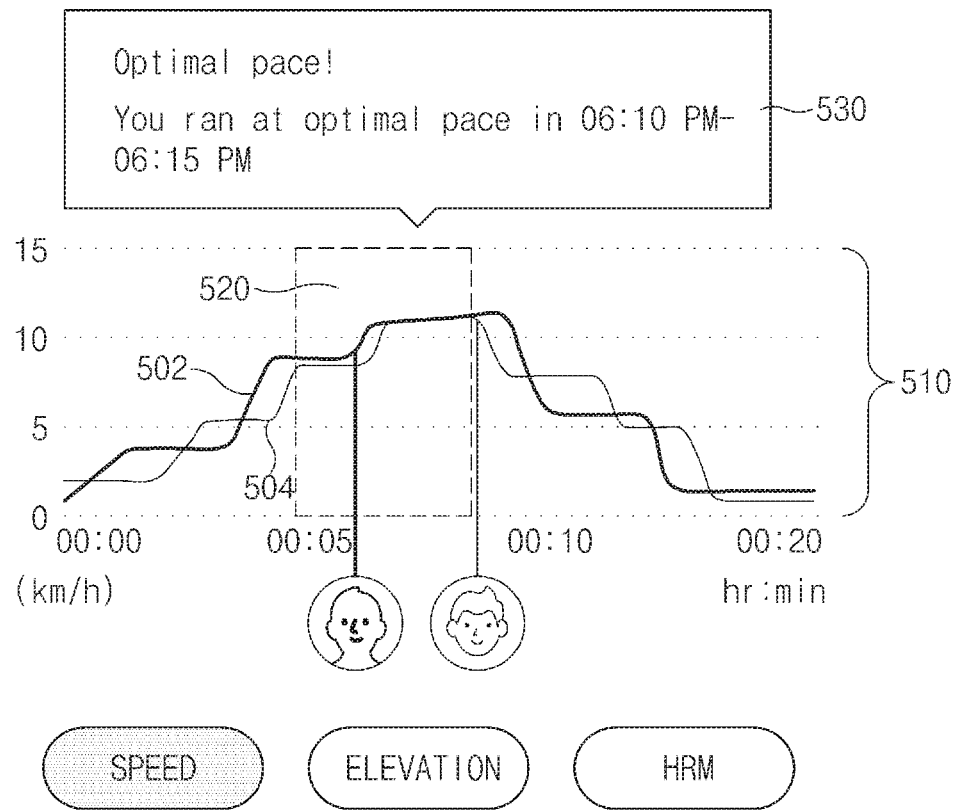
FIG. 5 is a diagram illustrating an execution screen of a workout application, including a graph about a workout associated data and description information about a specific section displayed over the graph, according to various embodiments of the present disclosure.

FIG. 5 is a diagram illustrating an execution screen of a workout application, including a graph about workout associated data and description information about a specific section displayed over the graph, according to various embodiments of the present disclosure. Referring to FIG. 5, the processor 140 may create a graph 510 about a speed for a workout time. The graph 510 may be displayed together with a workout record 502 of the user and a workout record 504 of the virtual character (such as a pacer). The processor 140 may select a section 520 distinguishable from other sections, from the graph 510. The section 520 may be a section in which the user works out at a speed similar to the pacer, and a corresponding detailed description may appear in description information 530.

Figure 6:
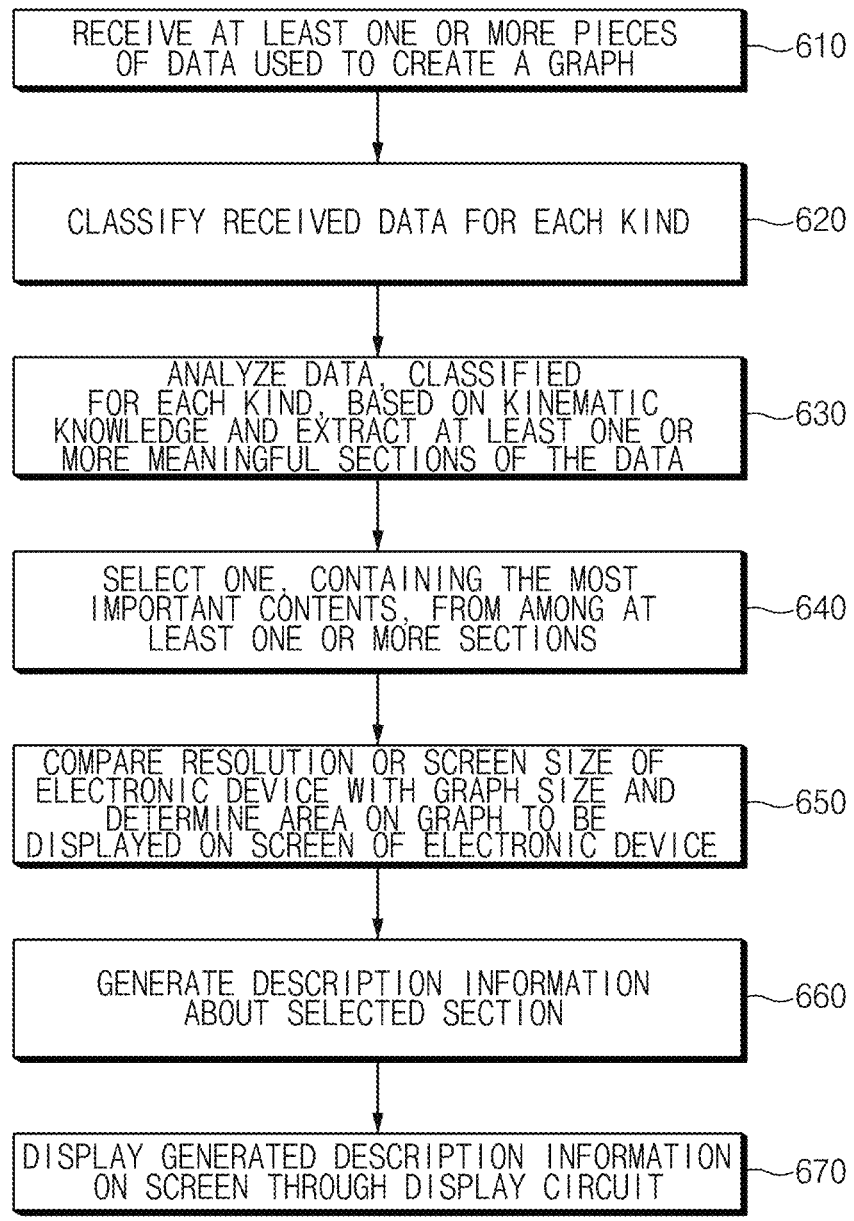
FIG. 6 is a flow chart illustrating a method for providing workout associated data and description information about a specific section displayed over the graph, according to various embodiments of the present disclosure.

FIG. 6 is a flow chart illustrating a method for providing workout associated data and description information about a specific section displayed over the graph, according to various embodiments of the present disclosure. In operation 610, the sensor circuit 120 may receive at least one or more pieces of data used to create a graph. In operation 620, the processor 140 may classify the data, received in operation 610, for each kind. In operation 630, the processor 140 may analyze the data, classified for each kind in operation 620, based on the kinematic knowledge and may extract at least one or more meaningful sections of the data. In operation 640, the processor 140 may select one, containing the most important contents, from among the at least one or more sections extracted in operation 630. In operation 650, the processor 140 may compare a resolution or a screen size of the electronic device 100 with a graph size and may determine an area on the graph to be displayed on a screen of the electronic device. In operation 660, the processor 140 may generate description information about the section selected in operation 640. The description information may be generated using a sentence, a picture, a symbol, and the like. In operation 670, the processor 140 may display the description information, generated in operation 660, on a screen through the display circuit 110.

Figure 7:
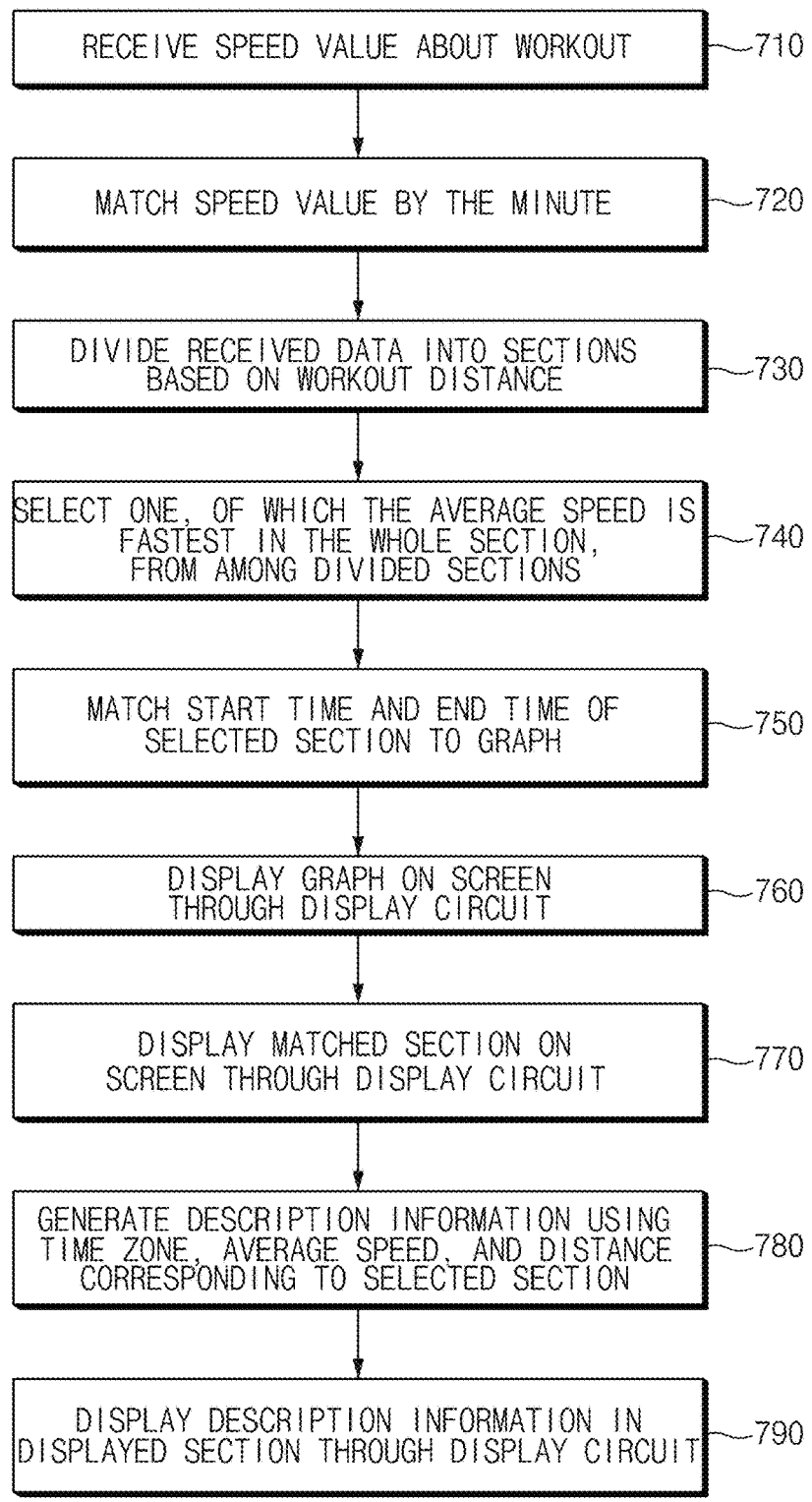
FIG. 7 is a flow chart illustrating a method for providing workout associated data and description information about a specific section displayed over the graph, according to various embodiments of the present disclosure.

FIG. 7 is a flow chart illustrating a method for providing workout associated data and description information about a specific section displayed over the graph, according to various embodiments of the present disclosure. In operation 710, the sensor circuit 120 may receive a speed value about a workout. In operation 720, the processor 140 may match a speed value by the minute. If corresponding data does not exist, the processor 140 may use data, viewed as being the most similar, as the corresponding data. In operation 730, the processor 140 may divide data, received in operation 710, into a plurality of sections based on a workout distance. For example, if the workout distance is shorter than 10 km, the received data may be divided into sections by a unit of 1 km; if the workout distance is longer than 10 km and shorter than 50 km, the received data may be divided into sections by a unit of 5 km. In operation 740, the processor 140 may select a section, of which the average speed is fastest in the whole section, from among the sections divided in operation 730. In operation 750, the processor 140 may match a start time and an end time of the section selected in operation 740, to the graph. In operation 760, the processor 140 may display the graph on a screen through the display circuit 110. In operation 770, the processor 140 may display the section, matched in operation 750, on the screen displayed in operation 760 through the display circuit 110. In operation 780, the processor 140 may generate description information using a time zone, an average speed, a workout distance, and the like corresponding to the section selected in operation 740. In operation 790, the processor 140 may display the description information in the section, displayed in operation 770, through the display circuit 110.

Figure 8:
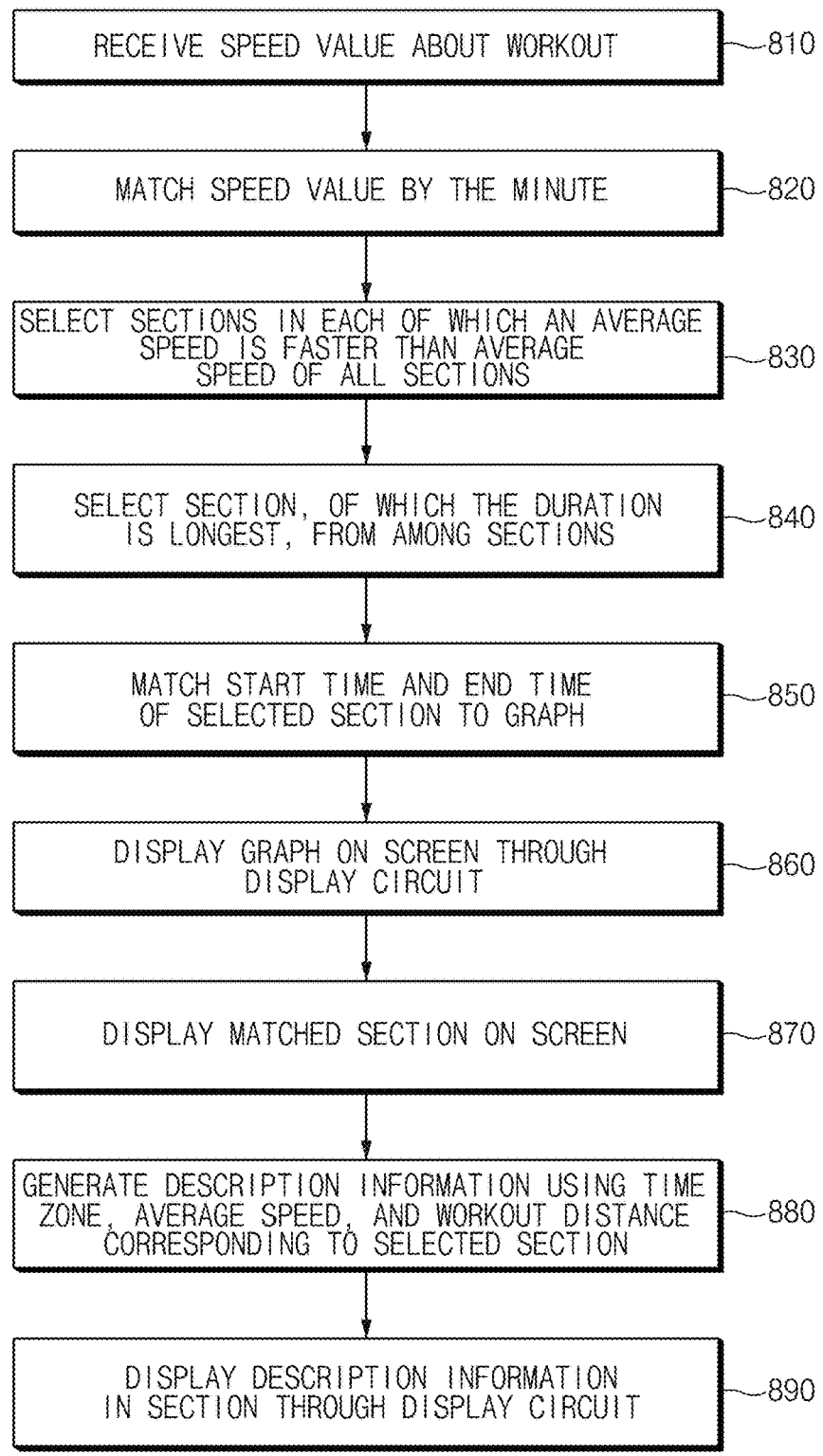
FIG. 8 is a flow chart illustrating a method for providing workout associated data and description information about a specific section displayed over the graph, according to various embodiments of the present disclosure.

FIG. 8 is a flow chart illustrating a method for providing workout associated data and description information about a specific section displayed over the graph, according to various embodiments of the present disclosure. In operation 810, the sensor circuit 120 may receive a speed value about a workout. In operation 820, the processor 140 may match a speed value by the minute. If corresponding data does not exist, the processor 140 may use data, viewed as being the most similar, as the corresponding data. In operation 830, the processor 140 may select a plurality of sections, an average speed of each of which is faster than an average speed of all sections. In operation 840, the processor 140 may select a section, of which the duration (or continuous time) is longest, from among the sections divided in operation 830. In operation 850, the processor 140 may match a start time and an end time of the section selected in operation 840, to the graph. In operation 860, the processor 140 may display the graph on a screen through the display circuit 110. In operation 870, the processor 140 may display the section, matched in operation 850, on the screen displayed in operation 860 through the display circuit 110. In operation 880, the processor 140 may generate description information using a time zone, an average speed, a workout distance, and the like corresponding to the section selected in operation 840. In operation 890, the processor 140 may display the description information in the section, displayed in operation 870, through the display circuit 110.

Figure 9A:
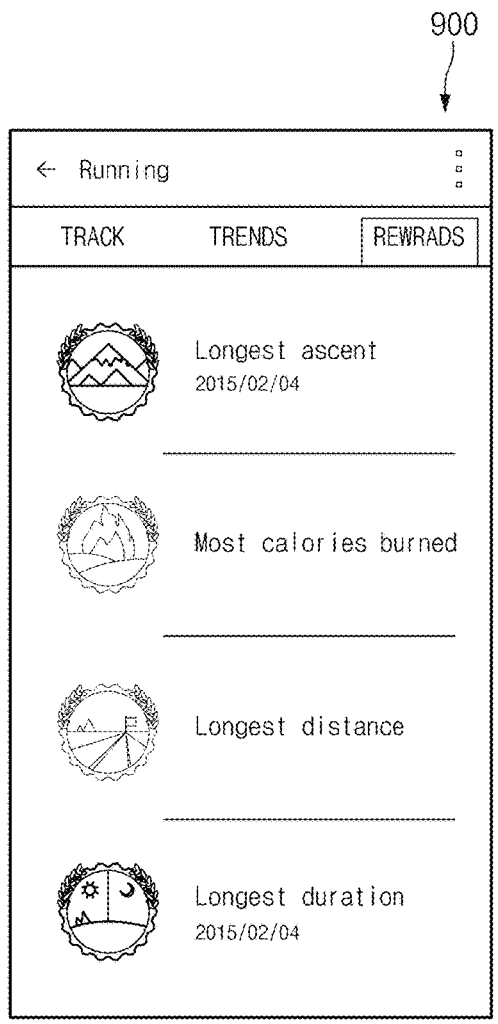
FIG. 9A is a diagram illustrating an execution screen of a workout application, including a reward provided based on workout associated data and an accumulated value of the workout associated data, according to various embodiments of the present disclosure.
Figure 9B:
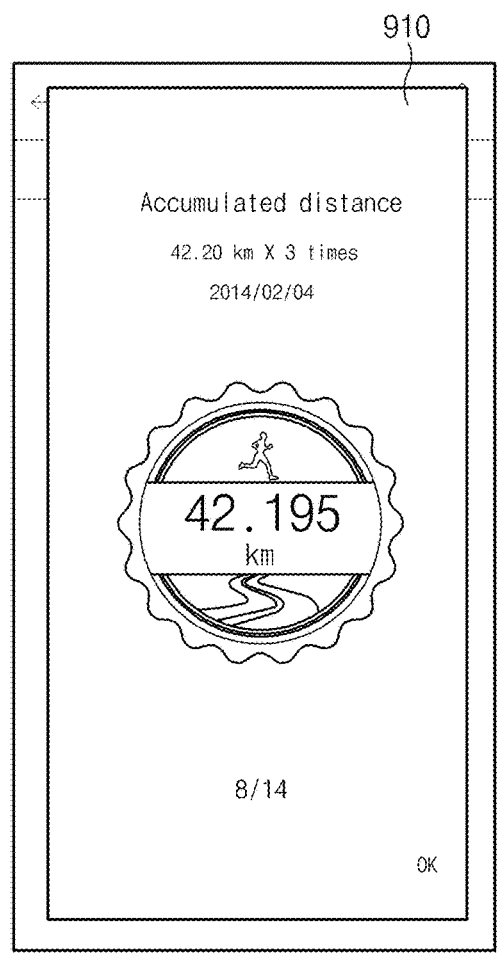
FIG. 9B is a diagram illustrating an execution screen of a workout application, including a reward provided based on workout associated data and an accumulated value of the workout associated data, according to various embodiments of the present disclosure.

FIGS. 9A and 9B are diagrams illustrating an execution screen of a workout application, including a reward provided based on workout associated data and an accumulated value of the workout associated data, according to various embodiments of the present disclosure. Referring to an execution screen 900 of a workout application, there is illustrated a list of a plurality of rewards provided in the case where the workout associated data or an accumulated value of the workout associated data satisfies a given condition. A reward(s), previously provided, from among the rewards may be displayed in color, and a reward(s), not previously provided, from among the rewards may be displayed in black. The provided reward may be displayed together with a date at which the reward is provided.

As described above, in the list of rewards displayed on the execution screen 900 of the workout application, the same kind of workout associated data, for example, a two-week reward, a four-week reward, a lifelong reward, and the like associated with the fastest speed reward may exist independently. A reward 910 may be displayed together with contents, a date, and the like of a corresponding reward, and a corresponding reward mark may be an image corresponding to the corresponding reward.

Figure 10:
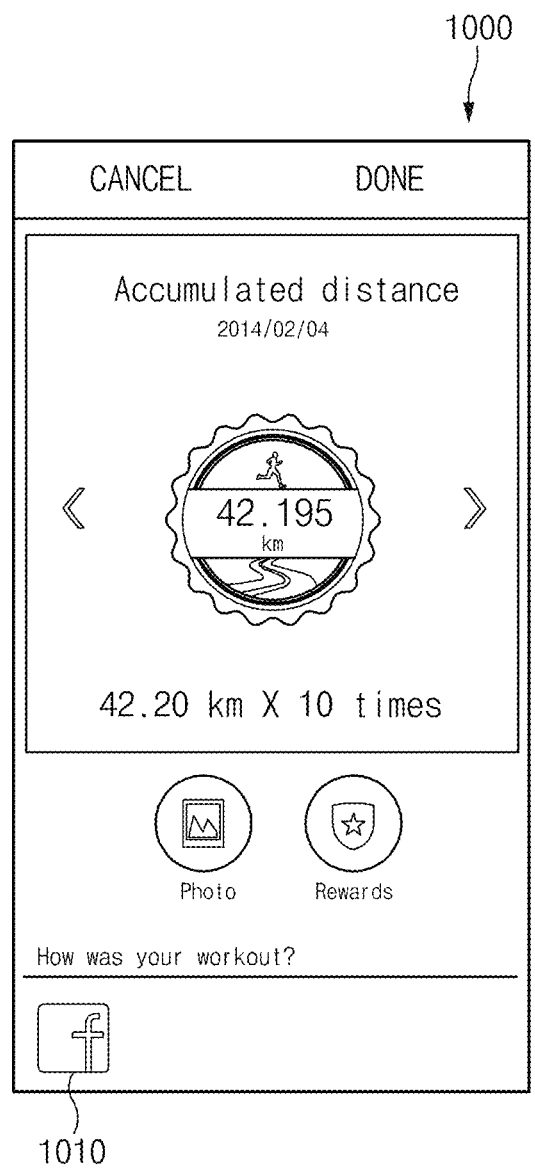
FIG. 10 is a diagram illustrating a method for transmitting to an SNS server a reward provided based on workout associated data and an accumulated value of the workout associated data, according to various embodiments of the present disclosure.

FIG. 10 is a diagram illustrating a method for transmitting to an SNS server a reward provided based on workout associated data and an accumulated value of the workout associated data, according to various embodiments of the present disclosure. An execution screen 1000 of a workout application may include a screen capable of checking a previously provided reward(s), and the screen for checking may include an icon 1010 capable of registering a provided reward at an SNS account such as Facebook, twister, Instagram, or the like. If receiving a user input to select the icon 1010 from the user, the processor 140 may generate a registration request about the reward and may transmit the registration request to the SNS server via the communication circuit 140.

Figure 11:
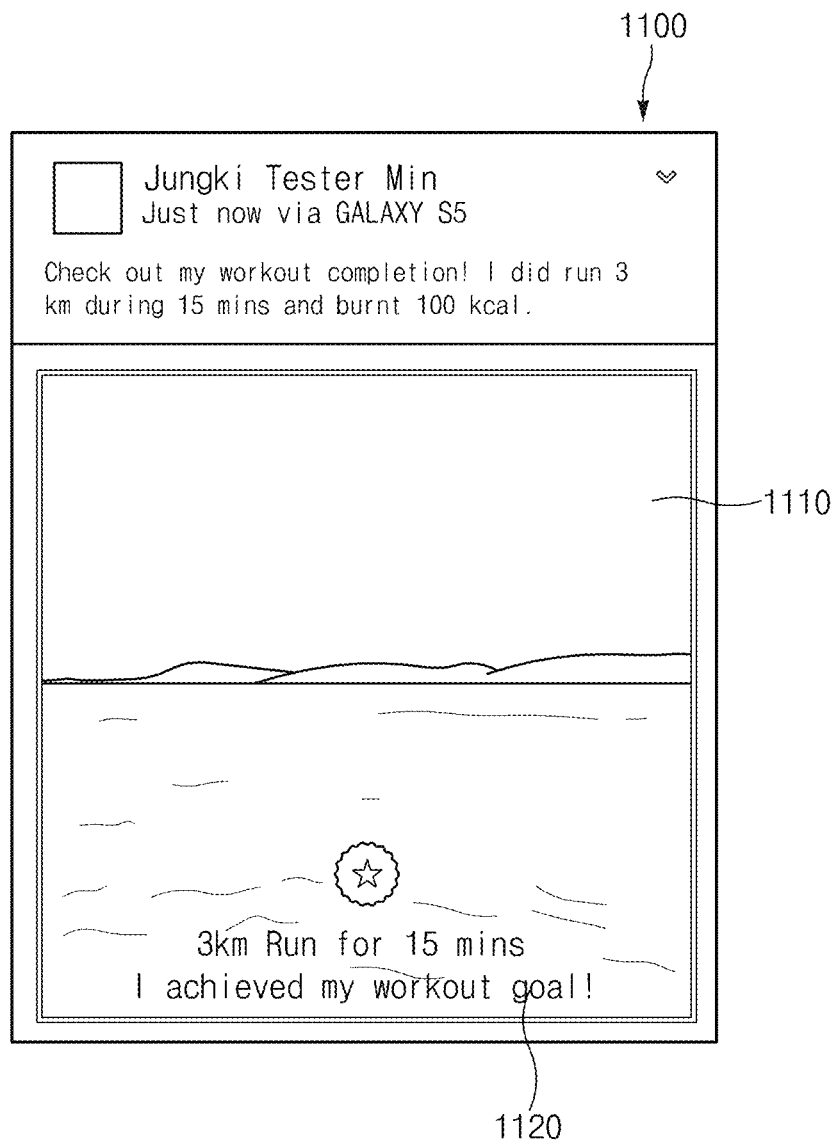
FIG. 11 is a diagram illustrating a screen in which a workout associated phrase is registered at an SNS page with an image, according to various embodiments of the present disclosure.

FIG. 11 is a diagram illustrating a screen 1100 in which a published image is registered at an SNS page with a workout associated phrase, as a notice registered at the SNS page, according to various embodiments of the present disclosure. The electronic device 100 may create an image 1110 and may transmit the image 1110 to an SNS server, and the image 1110 thus transmitted may be registered at an SNS page. In this case, the image 1110 may be a default image about a workout event or an image captured by the user during the workout. Furthermore, a workout associated phrase 1120 may include workout associated data, an accumulated value of the workout associated data, a reward, or the like. The workout associated phrase 1120 may be also inserted by the electronic device 100 in the image 1110.

The workout associated phrase 1120 may not be a phrase inputted by the user, but the workout associated phrase 1120 may be a phrase which the processor 140 automatically determines differently according to a situation. The processor 140 may automatically create the workout associated phrase 1120 using a workout discipline (such as running, cycling, hiking, or the like), a workout duration (such as two weeks, four weeks, lifetime, or the like), and achieved information (such as a workout distance, a speed, a pace, a time, an ascending height, a consumed calorie, or the like).

According to various embodiments of the present disclosure, the image 1110 or the workout associated phrase 1120 may include contents which correspond to a location of the electronic device 100, a date, and the like. For example, in the case of uploading the image 1110 at SNS on Christmas day, the processor 140 may create the image 1110 or the workout associated phrase 1120 so as to include contents such as a comment "Merry Christmas", a Christmas icon, or an image.

According to various embodiments of the present disclosure, an electronic device may include a sensor circuit configured to obtain workout associated data using at least one or more sensors, a processor electrically connected with the at least one or more sensors, and a memory electrically connected with the processor. The processor may classify the obtained data for each kind, may divide the data, which is classified for each kind, into a plurality of sections, may compare the sections with each other and selects at least one or more sections, and may provide description information about the selected section. According to various embodiments of the present disclosure, the obtained data may include at least one or more of kinds of data comprising workout time data, workout distance data, heart rate data, altitude data, and speed data; heart rate data according to a workout time, altitude data, speed data, and workout distance data; and heart rate data according to a workout time, altitude data, speed data, and workout time data.

According to various embodiments of the present disclosure, an operation in which the processor selects the at least one or more sections may be performed by comparing each of the plurality of sections with a user average value of the classified data. According to various embodiments of the present disclosure, an operation in which the processor selects the at least one or more sections is performed by comparing each of the plurality of sections with a reference value of the classified data. According to various embodiments of the present disclosure, the electronic device may further include a memory electrically connected with the processor, and the processor may display a graph about the classified data on a screen through the display circuit and may display the selected section and the description information on the graph.

According to various embodiments of the present disclosure, the provided description information may include at least one or more of data analysis information, workout effect information, and workout coaching information associated with the selected section. According to various embodiments of the present disclosure, an operation in which the processor divides the data, which is classified for each kind, into the plurality of sections may be to divide the data, which is classified for each kind, based on at least one or more of a workout time, a heart rate, an altitude, a speed, and a workout distance. According to various embodiments of the present disclosure, the processor may determine whether the obtained data or an accumulated value of each kind about the obtained data satisfies a given condition, and the processor may provide a reward if the obtained data or the accumulated value of each kind about the obtained data satisfies the given condition. According to various embodiments of the present disclosure, the reward may exist for each of a plurality of sections.

According to various embodiments of the present disclosure, the electronic device may further include a communication circuit electrically connected with the processor, and the processor may transmit the obtained workout associated data, the accumulated value of each kind, or the reward to an SNS server, based on a user input. According to various embodiments of the present disclosure, the processor may transmit the workout associated image or an image obtained through the sensor to the SNS server through the communication circuit together, and the obtained workout associated data, the accumulated value of each kind, or the reward may be inserted in the workout associated image or on an image obtained through the sensor, in a form of a text.

The processor may receive workout associated data from another electronic device, paired with the electronic device, through the communication circuit. An operation in which the processor classifies the obtained data for each kind may be to classify workout associated data, obtained using the at least one or more sensors, and workout associated data received through the communication circuit for each kind. According to various embodiments of the present disclosure, a method performed on an electronic device may include obtaining workout associated data using at least one or more sensors, classifying the obtained data for each kind, dividing the data, classified for each kind, into a plurality of sections, compares the sections with each other and selects at least one or more sections, and providing description information about the selected section. According to various embodiments of the present disclosure, the method may further include displaying a graph about the classified data on a screen, and further displaying the selected section and the description information on the displayed graph.

The term "module" used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (such as modules or functions thereof) or a method (such as operations) according to various embodiments of the present disclosure may be, for example, implemented by instructions stored in a computer-readable storage media in the form of a program module. The instruction, when executed by one or more processors (such as a processor 140), may cause the one or more processors to perform a function corresponding to the instruction. The computer-readable storage media, for example, may be the memory 140.

According to various embodiments of the present disclosure, a computer-readable recording medium recorded with an instruction may be provided. The instruction, when executed by at least one processor, may cause the processor to perform a method, the method including obtaining workout associated data using at least one or more sensors, classifying the obtained data for each kind, dividing the data, classified for each kind, into a plurality of sections, compares the sections with each other and selects at least one or more sections, and providing description information about the selected section.

A computer-readable recording medium may include a hard disk, a magnetic media, a floppy disk, a magnetic media (such as a magnetic tape), an optical media (such as a compact disc read only memory (CD-ROM) and a digital versatile disc (DVD), a magneto-optical media (such as a floptical disk), and hardware devices (such as a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to various embodiments of the present disclosure may include at least one of the above elements, or a portion of the above elements may be omitted, or additional other elements may be further included. Operations performed by a module, a program module, or other elements according to various embodiments of the present disclosure may be executed sequentially, in parallel, repeatedly, or in a heuristic method. Also, a portion of operations may be executed in different sequences, omitted, or other operations may be added.

An electronic device and a method according to various embodiments of the present disclosure may analyze workout associated data obtained through a sensor and may provide description information about a specific section based on the analysis result, thereby making it for the user to understand a workout effect easily without expertise. Also, the electronic device and the method may provide a reward through the obtained workout associated data or an accumulated value of the workout associated data, thereby inspiring the workout effect of the user. In addition, the electronic device and the method may effectively create to-be-shared contents based on a course, a picture, and workout associated data which are obtained during the workout.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. An electronic device comprising:
at least one sensor;
an image sensor;
at least one communication circuit;
a memory; and a processor electrically connected to the at least one sensor, the image sensor, the at least one communication circuit, and the memory, wherein the processor is configured to:
- obtain workout data associated with one continuous workout activity of a user of the electronic device using the at least one sensor,
- classify the workout data into a plurality of workout data types,
- divide, for each of the plurality of workout data types, the workout data into a plurality of sections,
- compare, for each of the plurality of workout data types, the plurality of sections with each other,
- select, for each of the plurality of workout data types, at least one section from among the plurality of sections based on a result of a comparison between the plurality of sections,
- provide, for each of the plurality of workout data types, description information of the at least one section,
- provide, for each of the plurality of workout data types, a reward to the user when the workout data corresponding to the at least one section satisfies a given condition,
- obtain a first image using the image sensor during the one continuous workout activity of the user,
- generate a text string using the reward and the workout data,
- generate a second image by inserting the text string in the first image, and
- transmit the second image to a social network service (SNS) server using the at least one communication circuit.

2. The electronic device of claim 1,
wherein the plurality of the workout data types comprises at least two data among workout time data, workout distance data, heart rate data, altitude data, or speed data; and
wherein the heart rate data indicates heart rates according to workout time or workout distance, the altitude data indicates altitude according to the workout time or the workout distance, the speed data indicates speed values according to the workout time or the workout distance, and the workout distance data indicates distances according to the workout time.

3. The electronic device of claim 1, wherein the processor is further configured to select, for each of the plurality of workout data types, the at least one section by further comparing each of the plurality of sections with a user average value for a corresponding workout data type.

4. The electronic device of claim 1, wherein the processor is further configured to select, for each of the plurality of workout data types, the at least one section by further comparing each of the plurality of sections with a reference value for a corresponding workout data type.

5. The electronic device of claim 1, further comprising:
a display circuit electrically connected to the processor, and
wherein the processor is further configured to display, on a screen of the display circuit, a graph of at least one workout data type among the plurality of workout data types along with the at least one section and the description information of the at least one section on the graph.

6. The electronic device of claim 1, wherein the description information comprises at least one of:
data analysis information associated with the at least one section, workout effect information associated with the at least one section, or workout coaching information associated with the at least one section.

7. The electronic device of claim 1, wherein the processor is further configured to divide, for each of the plurality of workout data types, the workout data into the plurality of sections based on at least one of workout time, heart rates, altitudes, speed values, or workout distances.

8. The electronic device of claim 1, wherein a plurality of rewards are set for each of a plurality of periods.

9. The electronic device of claim 1,
wherein the processor is further configured to transmit, based on a user input, the second image to the SNS server.

10. The electronic device of claim 1,
wherein the processor is further configured to pair with at least one external electronic device using the at least one communication circuit, and receive the workout data from the at least one external electronic device using the at least one communication circuit.

11. A method of an electronic device, the method comprising:
- obtaining workout data associated with one continuous workout activity of a user of the electronic device;
- classifying the workout data into a plurality of workout data types;
- dividing, for each of the plurality of workout data types, the workout data into a plurality of sections;
- comparing, for each of the plurality of workout data types, the plurality of sections with each other;
- selecting, for each of the plurality of workout data types, at least one section from among the plurality of sections based on a result of comparing the plurality of sections with each other; and
- providing, for each of the plurality of workout data types, description information on the at least one section;
- providing, for each of the plurality of workout data types, a reward to the user when the workout data corresponding to the at least one section satisfies a given condition;
- obtaining a first image using an image sensor of the electronic device during the one continuous workout activity of the user;
- generating a text string using the reward and the workout data;
- generating a second image by inserting the text string in the first image; and
- transmitting the second image to a social network service (SNS) server.

12. The method of claim 11, further comprising:
displaying a graph of at least one workout data type among the plurality of workout data types along with the at least one section and the description information of the at least one section on the graph.

13. A non-transitory, computer-readable recording medium storing one or more executable instructions that, when executed by at least one processor, cause the at least one processor to:
- obtain workout data associated with one continuous workout activity of a user of an electronic device;
- classify the workout data into a plurality of workout data types;
- divide, for each of the plurality of workout data types, the workout data into a plurality of sections;
- compare, for each of the plurality of workout data types, the plurality of sections with each other;

select, for each of the plurality of workout data types, at least one section from among the plurality of sections based on a result of comparing the plurality of sections with each other; and provide, for each of the plurality of workout data types, description information on the at least one section;

provide, for each of the plurality of workout data types, a reward to the user when the workout data corresponding to the at least one section satisfies a given condition;

obtain a first image using an image sensor of during the one continuous workout activity of the user;

generate a text string using the reward and the workout data;

generate a second image by inserting the text string in the first image; and transmit the second image to a social network service (SNS) server.

14. The non-transitory, computer-readable recording medium of claim 13, wherein the plurality of the workout data types comprises at least two data among workout time data, workout distance data, heart rate data, altitude data, or speed data; and wherein the heart rate data indicates heart rates according to workout time or workout distance, the altitude data indicates altitude according to the workout time or the workout distance, the speed data indicates speed values according to the workout time or the workout distance, and the workout distance data indicates distances according to the workout time.

15. The non-transitory, computer-readable recording medium of claim 13, wherein the one or more executable instructions further cause the at least one processor to select, for each of the plurality of workout data types, the at least one section by further comparing each of the plurality of sections with a user average for a corresponding workout data type.

16. The non-transitory, computer-readable recording medium of claim 13, wherein the one or more executable instructions further cause the at least one processor to select, for each of the plurality of workout data types, the at least one section by further comparing each of the plurality of sections with a reference value for a corresponding workout data type.

17. The non-transitory, computer-readable recording medium of claim 13, wherein the one or more executable instructions further cause the at least one processor to display, on a screen of a display circuitry, a graph of at least one workout data type among the plurality of workout data types along with the at least one section and the description information of the at least one section on the graph.

18. The non-transitory, computer-readable recording medium of claim 13, wherein the description information comprises at least one of:

data analysis information associated with the at least one section, workout effect information associated with the at least one section, or workout coaching information associated with the at least one section.

* * * * *